United States Patent [19]

Lauber

[11] 4,265,326

[45] May 5, 1981

[54] ROLLING AND STEPPING VEHICLE

[75] Inventor: Ernst Lauber, Thun, Switzerland

[73] Assignee: Willy Habegger, Hünibach near Thun, Switzerland

[21] Appl. No.: 14,593

[22] Filed: Feb. 23, 1979

[51] Int. Cl.³ .......................................... B62D 57/02
[52] U.S. Cl. .................................... 180/8 R; 180/8 B
[58] Field of Search ................. 180/8 R, 8 B, 8 BA, 180/8 C, 8 D, 8 E, 8 F; 212/59 R, 145; 305/1, 2, 3

[56] References Cited

U.S. PATENT DOCUMENTS

| | | | |
|---|---|---|---|
| 3,109,506 | 11/1963 | Schröter et al. | 180/8 R |
| 3,306,390 | 2/1967 | Jamme | 180/8 R |
| 4,049,070 | 9/1977 | Soyland | 180/8 C |

FOREIGN PATENT DOCUMENTS

| | | | |
|---|---|---|---|
| 202208 | 6/1956 | Australia | 212/145 |
| 2245793 | 12/1973 | Fed. Rep. of Germany | 180/8 B |
| 609709 | 7/1960 | Italy | 280/165 |

*Primary Examiner*—John A. Pekar
*Attorney, Agent, or Firm*—Karl F. Ross

[57] ABSTRACT

A rolling and stepping vehicle capable of serving as a platform for a variety of working elements, e.g. a crane or an excavator, has a central support provided with a plurality of outwardly extending traveling legs. Each traveling leg is swingable relative to the support about a respective vertical axis and is subdivided into an outrigger shank and a support shank articulated together. The support shanks can have extensible rams and are provided with rolling elements, e.g. wheels or tracks.

13 Claims, 14 Drawing Figures

ROLLING AND STEPPING VEHICLE

CROSS REFERENCE TO RELATED APPLICATIONS

The present application is related to my commonly assigned, copending applications Ser. No. 014,687 and Ser. No. 014,594 both of which are hereby incorporated in their entirety by reference.

FIELD OF THE INVENTION

The present invention relates to a vehicle or machine capable of rolling and stepping travel and, more particularly, to a tool platform capable of being used in irregular terrains such as stepped and terraced ground, slopes, mountains and the like.

BACKGROUND OF THE INVENTION

There are so-called stepping excavators which are capable of some degree of rolling travel and are adapted to be laterally or longitudinally stepped with a striding movement. Such vehicles have been found to be particularly effective in sloping terrain and wherever there may be difficulty in assuring an effective purchase of the working platform upon the ground.

As a rule, such excavators have two wheel legs and two support legs. The wheel legs carry non-driven wheels while the support legs are provided with ground-engaging pads.

For a stepwise movement of the vehicle, the excavating boom or arm is drawn inwardly so that the shovel or scoop rests upon the ground, the support legs are raised and the vehicle body shifted using the rolling movement of the wheel legs; the support legs are then lowered to engage the ground, the scoop is raised and the process repeated for further advance of the excavator.

Such machines are not capable of self-propelled or purely rolling travel nor are they capable of a stepwise displacement without the aid of the excavator boom. As a result, the displacement in operation of the machine is inconvenient and unsatisfactory in many cases.

OBJECTS OF THE INVENTION

It is the principal object of the present invention to provide an improved vehicle, adapted to serve as a machine platform for any desired purpose, which avoids the disadvantages of earlier systems and which is capable of more versatile use than the earlier systems.

Another object of the invention is to provide a vehicle for the purposes described which can be shifted into a compact or low state or a gantry or raised configuration in a simple manner and with variable wheel spread, tracking width and interaxial wheel spacing.

Still another object of the invention is to provide a vehicle having improved climbing and rolling capabilities and which can be used in an effective manner on steep slopes, terraced ground or stepped terrain.

SUMMARY OF THE INVENTION

These objects and others which will become apparent hereinafter are attained, in accordance with the invention, in a rolling and stepping vehicle which comprises a central support forming a platform from which traveling legs project, the legs each being pivotal relative to the support about a respective vertical axis. According to the invention each of the legs comprises an outrigger which is swingable in the respective vertical plane, relative to the support, which can form a platform for a mechanism such as an excavator scoop or a crane boom, and with a support shank articulated to the respective outrigger.

Each support shank is formed with rolling means, e.g. a wheel or track engageable with the ground, and with a support member or ram which can be extended for firm purchase of the leg upon the ground.

Thus each outrigger shank is swingable in vertical and horizontal planes in the central body while the support shank is rotatable about a vertical longitudinal axis relative to the outrigger for steering movement of the respective wheel, in addition to being able to assume various angular positions relative to the outrigger in the respective plane. The shanks each can thus be formed as wheel columns which can have telescopingly extensible support rams.

Respective cylinder arrangements form actuating means for the outrigger and the support shanks.

The resulting vehicle has a spiderlike arrangement of wheel legs which are pivotable and inclinable in any convenient direction and thus can be stretched out or drawn in for the stepwise advance of the machine along the ground. Furthermore because the support rams can be extended or retracted, the wheels can be brought into play or not, as required, and either a firm engagement of the ram or a rolling engagement of the leg with the ground is possible. The movement along the ground or a stepping or climbing mode can thus use either the rams alone or a combination of the rams and wheels.

Furthermore, the articulated construction of the traveling legs enables the body or central member of the vehicle to be raised into a portal or gantry position or lowered into a compact position.

Since each traveling leg can be articulated and actuated fully independently of the remaining traveling legs, the vehicle as a whole can be positioned on any stepped or inclined terrain while maintaining the central body in a horizontal attitude to the extent inclination of this body is undesirable. In addition, the relative inclinabilities of the shanks and their outriggers permit a wide range of tracking widths to be obtained, i.e. the track of the vehicle during normal travel can be narrow or wide as may be desired. Furthermore a wide range of interaxial spacing of the wheels can be obtained and the overall mobility in rolling travel, stepping or climbing is improved over that which one can obtain with conventional systems.

The outriggers are preferably formed with parallelogrammatic linkages between crossheads pivotally connected to the support at vertical axes, and respective pivot heads which are pivotally connected to the shanks at the steering axes.

The pivot head may be connected with the fork of the support shank so as to permit the included angle between the shank and outrigger to be varied while maintaining the attitude of the vertical steering axis. This permits a vertical orientation of the wheel to be maintained in spite of the angular position of the outrigger. Any inclination of the support shank relative to the horizontal plane of the central body can likewise be maintained constant independently of the inclination to this plane of the respective outrigger.

Each support shank can have a telescopingly extensible ram which can be hydraulically actuated which, in combination with the angular positions which can be assumed by the traveling legs facilitates the stepping operation and/or shifting of the system into a portal or gantry (raised) position and a lowered or compact position.

The central support can be provided with a turntable and an operator housing which can receive various interchangeable tools for use of the machine as an excavator, dredge, tractor, crane, workplatform, military weapons carrier (gun carriage), drill carriage or the like. In fact the vehicle can be used with any terrain or surface for an effective purchase as may be required for all of the above machines. The pads of the rams can be modified for steep or shallow slopes, on sand, bog or marsh, snow, ice or stone and for effective climbing or sliding across the ground. For road traveling the portal or gantry position can provide high ground clearance and the compact state can be provided wherever a low center of gravity is desired.

The machine can be used for the raising, lowering and transportation of loads, can be capable of self-loading and, in general, has all of the movement capabilities of a spider with any limitations being overcome by the use of telescopic cranes or excavator booms capable of reaching from the support.

BRIEF DESCRIPTION OF THE DRAWING

The above and other objects, features and advantages of the present invention will become more readily apparent from the following description, reference being made to the accompanying drawing diagrammatically illustrating the principles of the present invention and in which.

SPECIFIC DESCRIPTION

In the following description, reference will be made in broad terms to a "vehicle", intending thereby to connote any structure with mobility over the ground or upon various types of terrain, regardless of the purpose for which the vehicle, as a platform, is to be put. For example, various portions of the vehicle are articulated to other parts by knuckles, pivot heads and the like having horizontal and vertical pivots which may not be shown in detail but which are, of course, elements well-known in the art and which have been shown, to the extent necessary for a full understanding of the invention, in the above-mentioned commonly assigned copending applications.

As far as details of the combination wheels and support legs are concerned, reference may be had to the above-mentioned application Ser. No. 014,687 which fully describes the steering capabilities of the wheels, their self-propulsion or braking capabilities and the telescoping ram arrangement associated with the wheels.

For parallelogrammatic linkages between the central support and the wheel or ram legs, reference may be had to the traveling leg arrangements more fully described in the above-mentioned copending application Ser. No. 014,594.

Naturally, the "vehicle" described below can have any of the applications described above, e.g. can be a weapons or tool platform adapted to be used on inclined, terraced, stepped or other irregular terrain, can be a platform for an excavator or crane, can be a drilling platform, or, in the most general sense, can be used to support any tool, equipment, load carrier or earth moving attachment for industrial agricultural, mining and earth moving purposes.

Finally, as to general matters, it should be clear that the actuation of the various arms, knuckles, crossheads and pivots can be effected by any means conventional in the art for this purpose. Preferably cylinder arrangements will be used, these cylinder arrangements including a piston which can be pivotally connected to one of the two members articulated to each other and a cylinder pivotally connected to the other of these members. The machinery with which the invention is applicable, generally comprises hydraulic power systems for propulsion and control purposes and these cylinder arrangements may be articulated by the hydraulics normally used with the machine. However, other articulating arrangements may be used, for instance rotary hydraulic motor, winch and—cable arrangements and electrical controls of power systems.

Figure 1:
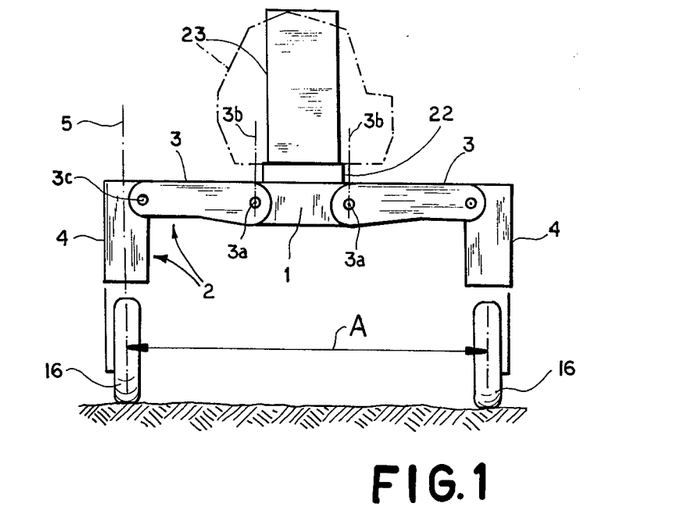
FIG. 1 is a front schematic elevational view of a rolling and stepping vehicle according to the invention with the central portion or chassis raised into its gantry or portal position.
Figure 2:
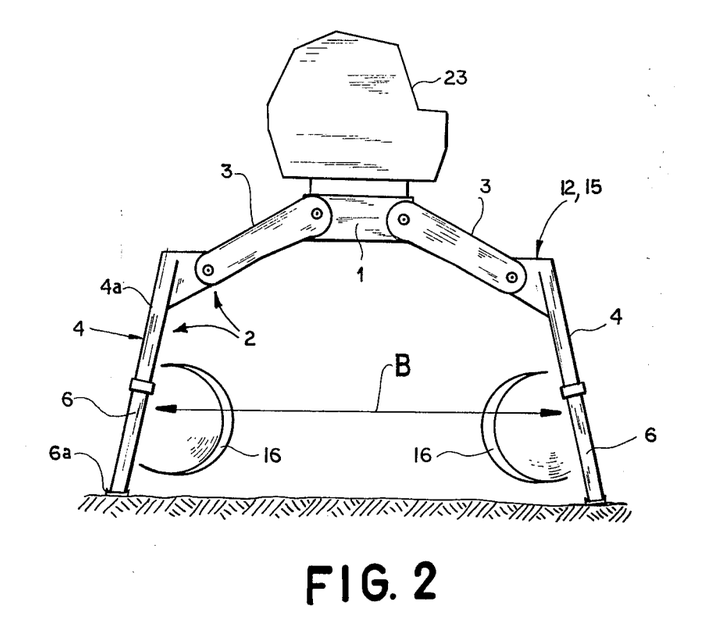
FIG. 2 is a schematic side elevational view of the vehicle of FIG. 1 in a still higher portal position with the support rams extended to lift the wheels from the ground.
Figure 3:
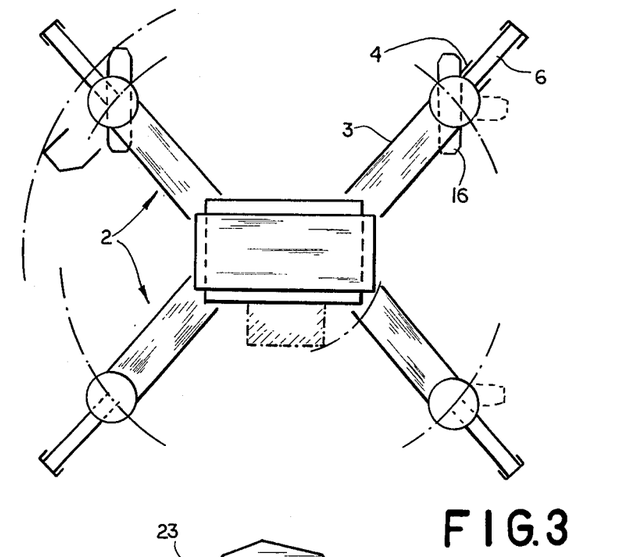
FIG. 3 is a schematic plan view of the vehicle of FIGS. 1 and 2 illustrating the versatility of the machine of the invention.

In FIGS. 1 and 2, I have shown, in the most diagrammatic form, a vehicle which comprises a central body and a plurality of traveling legs 2, in the embodiment illustrated four in number. As a result, the vehicle has a spider configuration.

Each of the traveling legs 2 is articulated to the support 1 and is itself an articulated leg comprising an outrigger member or shank 3 which is pivotally connected to the support 1 and a support shank or leg 4 which is articulated to the outrigger leg 3.

As described, for example in the above-mentioned application Ser. No. 014,594 the outrigger portion of the leg is swingable in a vertical plane, e.g. about the pivots 3a shown in FIG. 1, and in a horizontal plane, e.g. in a crosshead or pivot body which may be connected to the support 1 for pivotal movement about the vertical axis 3b.

The support shank 4 of each of the legs is rotatable about a vertical axis as has been represented at 5 in FIG. 1 and can serve as a steering axis since it can coincide with the center of a wheel carried by the support shank 4. In addition, the support shank 4 is articulated to the outrigger shank, e.g. at 3c about a horizontal axis. The horizontal pivots 3a and 3c illustrated in FIG. 1 may also represent pairs of such pivots when a parallelogrammatic linkage is applied as is the case in application Ser. No. 014,594.

Each of the support shanks 4 can thus form a wheel leg (i.e. a wheel carrying column) which is provided with a telescoping support ram 6, preferably of the construction described in the copending application Ser. No. 014,687. As has been illustrated diagrammatically in FIG. 2, the shank 4 is formed as a tubular member 4a in which the tubular ram 6 is received, this ram having a pad 6a which may be contained for effective purchase on the ground. Within the shank 4 a cylinder arrangement is provided to extend or retract the ram 6.

Figure 13:
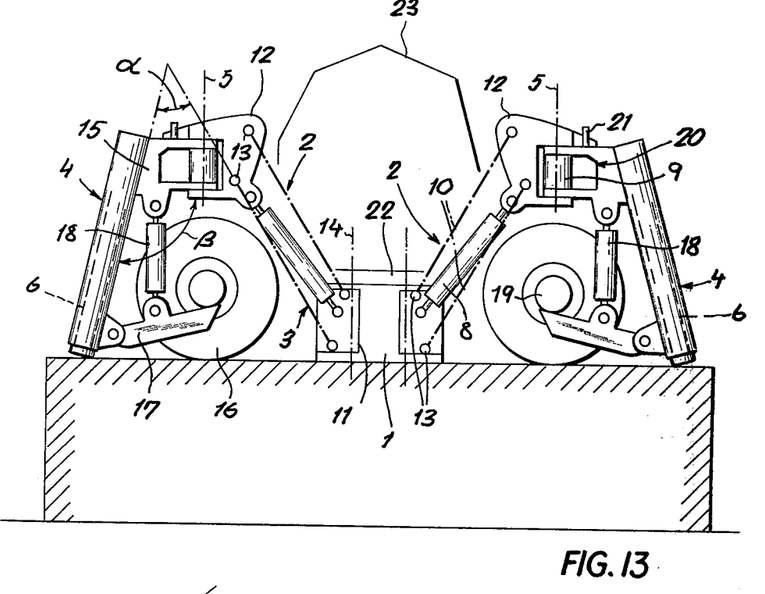
Figure 14:
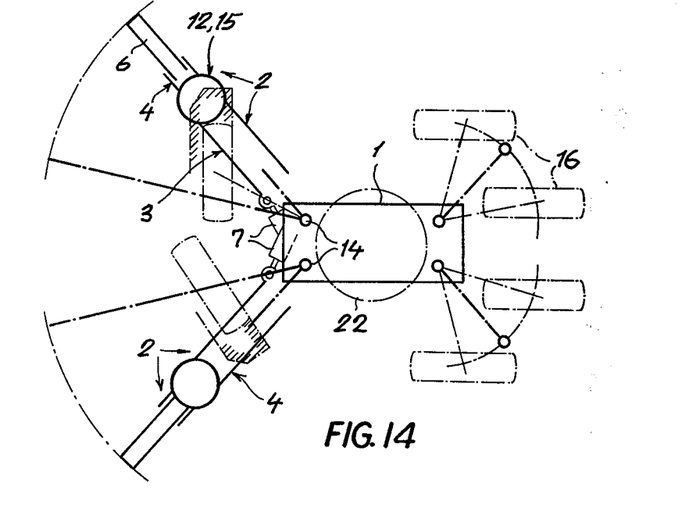
FIG. 14 is a diagrammatic plan view illustrating various positions attainable with the vehicle of FIG. 1 or of FIGS. 11 through 13.

As can be seen from FIG. 13 especially, the shanks 3 and 4 can be actuated by respective cylinder arrangements 7, 8, 9. For example, the cylinder arrangements 7 (see FIG. 14) swings the outrigger shanks 3 about respective vertical axes via the pivots 14 (FIG. 13) while the cylinder arrangement 8 raises and lowers the outrigger shank and the cylinder arrangement 9 pivots the shank 4 about the vertical axis 5 relative to the outrigger shank for steering movement.

In the best mode embodiment of the invention, the outrigger shank 3 is formed by a parallelogrammatical linkage consisting of a pair of parallel links 10 (FIGS. 11 through 13) which are pivotally connected at one end to the crosshead 11 (FIG. 13) to enable their swinging movement about the vertical axis 3b at the pivots 14 on the central body 1.

Figure 11:
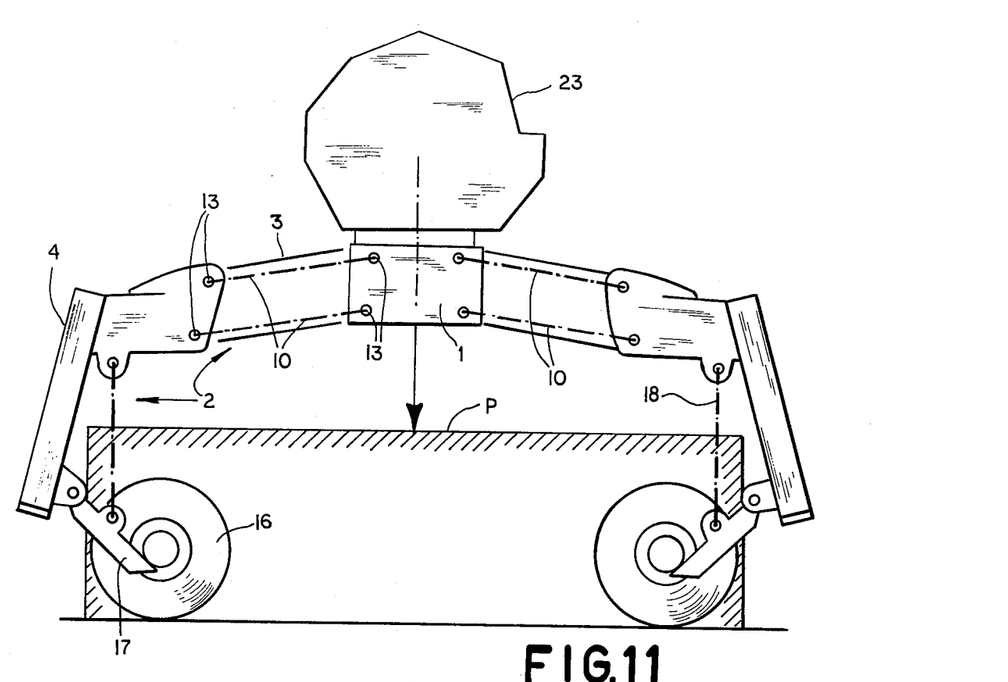
FIGS. 11 through 13 are diagrams illustrating the operation of a vehicle similar to that of FIG. 1 for automatic mounting upon a support platform or transport vehicle.
Figure 12:
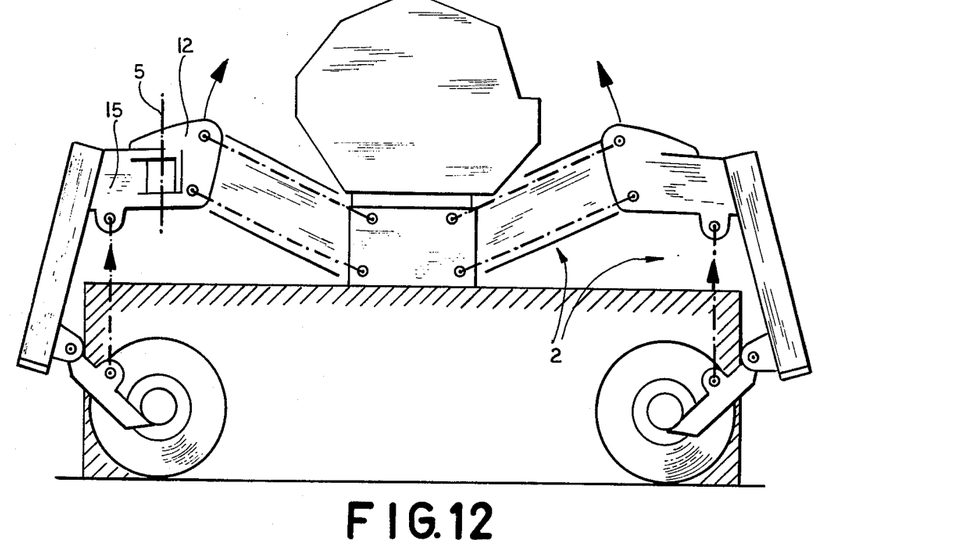

At their opposite ends, the parallelogrammatic links 10 are pivotally connected to a pivot head 12 which defines the pivot axis 5 with a fork 15 of the support shank 4. The cylinder 8 can be disposed substantially diagonally between two links and may, for example, be pivotally connected to the crosshead on one side and to the lower link on the other side.

The pivots between the parallelogrammatic links 10 and the crosshead 11 or the pivot head 12 are represented at 13 and define horizontal pivot axes enabling the traveling leg 2 to swing in a vertical sense. Because crossheads 11 can rotate about the vertical pivots 14 the leg 2 can additionally swing in a horizontal sense.

Because of this composite pivotal movement, it is possible to adjust the tracking width of the vehicle, i.e. the center-to-center distance between the wheels as shown at A, and the interaxial spacing B of pairs of wheels 2 over a relatively wide range.

The pivot head 12 is connected pivotally to the fork head 14 of the support shank 4 (FIG. 13) so as to define the vertical steering axis 5 therewith, the axis 5 generally coinciding with the center of the wheel.

The shank 4 can form an adjustable joint angle $\alpha$ with the shank 3 while maintaining the verticality of the axis 5.

The angle $\beta$ between the head 15 and the ram 6 and the wheel column is constant.

Each wheel column carries a wheel 16 which represents a rolling traveling element and is, in the best mode, a wheel which can be provided with a hydrostatic drive motor 19 and is mounted at the end of an arm 17 which is articulated in turn to the lower end of shank 4 and can be swung upwardly or downwardly by the cylinder arrangement 18 pivotally connected to the head 15 and to the arm or lever 17 intermediate its end. Naturally, a track assembly can be carried by the lever 17 as a rolling appliance instead of the wheel 16. The cylinder arrangement 18 can also be provided as a shock absorber as described in the aforementioned copending application Ser. No. 014,687.

The support shank 4, the wheel 16, the wheel-carrying lever 17 and its actuating cylinder 18 preferably lie in a common vertical plane.

The wheel 16 is disposed along the inner side of the support shank 4 or the wheel column, i.e. along the side of the shank or column turned toward the vertical median plane through the vehicle.

As previously noted, each wheel 16 can be provided with a respective drive motor 19, preferably in the form of a hydraulic motor, or a respective braking device which can be constituted by the hydraulic motor operating in a pumping mode.

For all-wheel drive, all of the hydraulic motors of the wheels may be simultaneously energized and, when the vehicle has all of its four wheels in engagement with the ground, the individual motor drives for the wheels may be energized in pairs or individually while some may be braked for left or right turns or for turning in place.

The cylinder arrangements 7 can be pivotally connected to the crosshead 11 at one way and to the central body 1 at the opposite side and may be provided in pairs on either side of each crosshead 11 so as to swing the outriggers in horizontal sense.

The pivot axes for the cylinder arrangements 8 are so disposed that they do not coincide with the horizontal axes 13 at the crosshead 11 or the pivot head 12.

The free space between the pivot head 12, which is formed as a fork, and the fork portion 15 of the shank 4 accommodate the steering mechanism 9 which enables a rotation of the respective wheel 16 about a substantially upright axis through at least 180°. Thus the wheels can be oriented in planes parallel to the longitudinal median planes for longitudinal rolling travel or can be rotated to the right and to the left through 90° for steering of the vehicle.

Naturally, this 180° angular displacement can be composed of a 90° angular displacement between longitudinal and transverse travel orientations of the wheel and additional angular displacement of ±45° for the travel of the vehicle along curves.

Between the pivot head 12 and the fork 15, there is provided a locking mechanism 21, e.g. a pin which can engage in holes of the fork, to lock the fork 15 and the pivot head 12 against relative angular displacement about the steering axis 5, i.e. to block steering movement when the legs of the vehicle must withstand lateral forces.

As will be apparent from the plan views of the drawing, the central body 1 is generally elongated and rectangular with the traveling legs 2 provided at its corners. It can be formed with a turntable 22 upon which the working mechanism 24 and the operator housing 23 are mounted and from which they can be removed and replaced by other tools. The tool 24 is, as has been diagrammatically shown in FIG. 6, a crane, also other mechanisms, e.g. a shovel or the like can be provided as well.

The vertical steering axis 5, while preferred, can be somewhat inclined, e.g. as a conventional kingpin axis, to allow the lower ends of the shanks 4 to be spread further outwardly in the portal or gantry setting. In this case, each of the outrigger shanks can be provided with a somewhat shorter upper link and a somewhat longer lower link 10.

Braking of all of the left wheels 16 while the right wheels are propelled allows the vehicle to travel around a left hand curve while braking of the right hand wheel 16 while the left hand wheels are forwardly driven permits the vehicle to travel along a right hand curve. The forward drive of the right hand wheel and rearward drive of the left hand wheel permits the vehicle to turn in place.

The drawing also illustrates various dispositions of the vehicle which need not be described in any greater detail since they are fully understandable from the Figures themselves. For example, when travel on flat terrain over obstacles is required, the shanks 4 may be disposed at right angles to the outriggers 3 and the outriggers substantially coplanar with the body 1 of the vehicle as shown in FIG. 1 in the gantry position thereof.

If the vehicle must be supported in this gantry position against rolling movement, the rams 6 can be extended as shown in FIG. 2 and the wheels 16 thereby lifted from the ground. In addition, the wheels 16 can be raised in the position shown in FIG. 1 to allow the nonextended ram pads to settle upon the ground, affording wheel purchase with a low gantry position.

When the body of the vehicle must be raised to a still higher position, the outriggers 3 may be inclined downwardly and outwardly from the body 1 and can include obtuse angles with support shanks 4 in the position illustrated in FIG. 1, the body being raised still further by extension of the rams 6.

Figure 4:
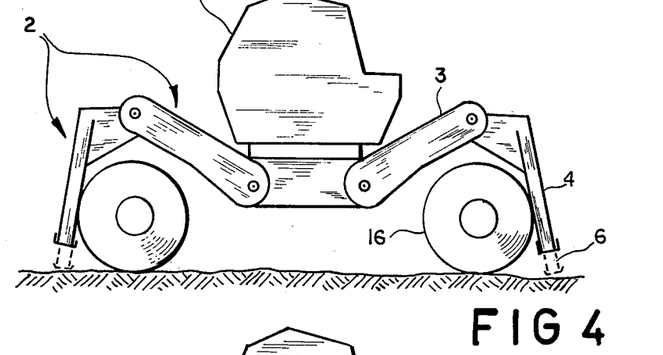
FIG. 4 is a diagrammatic side elevational view of the vehicle of FIG. 1 in its lowered position with the support rams withdrawn to allow the vehicle to roll along the ground.

In FIG. 4, I have shown a more compact configuration in which the outriggers 3 are inclined upwardly and outwardly from the body 1, and the shanks 4 include acute angles with the respective outriggers. This position is suitable for rolling travel when low ground clearance is sufficient, and here again the wheels can be raised or the ram 6 lowered (broken lines) to hold the vehicle in place for working operations in which the vehicle is subject to considerable loading.

Figure 5:
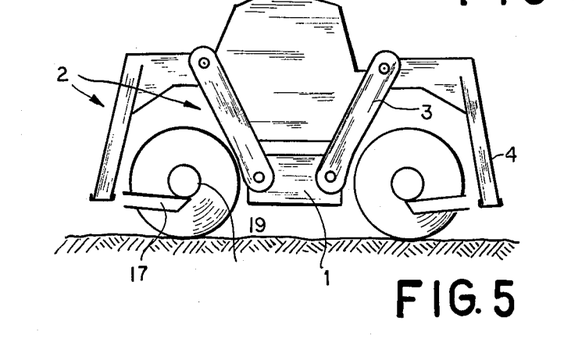
FIG. 5 is a view similar to FIG. 4 but with the central portion of the vehicle lowered further toward the ground in a more compact state.

FIG. 5 illustrates a position in which the angles between the support shanks and their outriggers are reduced still further and hence at body 1 is closer to the ground. This body can actually be seated on the ground by raising the wheels 16 at which time the pads or ram 6 also engage the ground.

Figures 6, 7, 8:
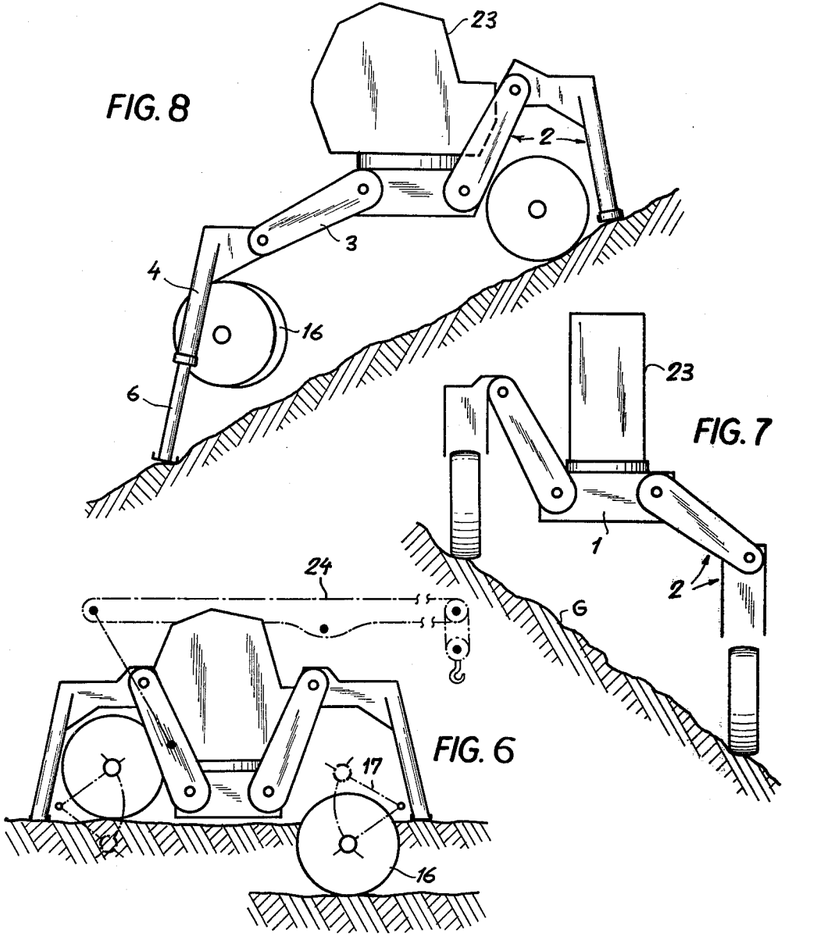
FIG. 6 is a diagram showing the apparatus of FIGS. 1 and 2 in use upon a stepped terrain.
FIG. 7 is a diagram showing the vehicle in a rolling mode upon a step incline with the central portion maintained horizontal.
FIG. 8 is an illustration of the vehicle of FIG. 1 in diagrammatic side elevation in a climbing mode on a step incline or having obtained a purchase for work.

FIG. 6 shows the vehicle of the present invention in a condition in which the wheels on one side can engage a lower step than the wheels or support pads on the opposite side. In the same context, reference can be had to FIG. 7 in which the horizontal body 1 is supported on an incline G so as to roll thereon. In this case, the outriggers on one side are inclined upwardly from the body while those on the opposite side are inclined downwardly.

In FIG. 8 I have shown an arrangement in which the vehicle is supported by its rams on an inclined surface, it being understood that the vehicle can, in such an operation, sidle upwardly or downwardly along the incline.

Figure 9:
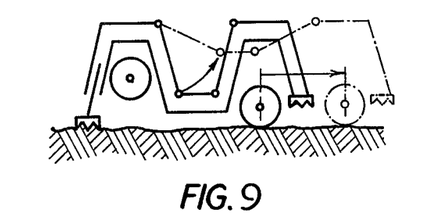
FIGS. 9 and 10 are diagrams illustrating the operation of the vehicle of FIG. 1 in a stepping operation.
Figure 10:
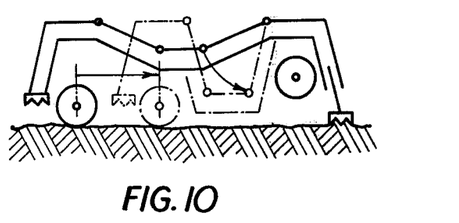

The walking movement will be more readily apparent from a comparison of FIGS. 9 and 10. The wheels on the left hand side of the vehicle are raised and the rams extended to grip the ground while the wheels on the right hand side of the vehicle are lowered. The pivot between the left outriggers and the vehicle body is then swung in a counterclockwise sense while the right outriggers are swung in a clockwise sense relative to the body to shift the right hand portion of the vehicle to the right as illustrated by broken lines in FIG. 9.

The right hand wheels are then raised and the right hand rams extended (FIG. 10) while the left hand outriggers are swung in the clockwise sense and the right hand outriggers in the counterclockwise sense relative to the body to draw the left hand side of the vehicle, whose wheels have been lowered, to the right.

The vehicle is also capable of loading itself upon a transporter or support pedestal as shown in FIGS. 11 through 13. In this case, the vehicle in the gantry position is rolled so that its wheels straddle the pedestal P (FIG. 11) and the wheels are then raised and the outriggers swung upwardly to lower the body onto the pedestal or transporter (FIG. 12).

The right and left hand pairs of arms can then be swung toward one another (FIG. 14) to bring the wheels and the respective shanks 4 to lie upon the pedestal or transporter.

I claim:

1. A rolling and stepping vehicle comprising:
   a central support adapted to serve as a tool platform;
   a plurality of traveling legs extending outwardly from said support;
   means pivotally connecting each of said legs to said support for swinging movement about a respective upright axis, each of said traveling legs including an outrigger pivotally connected to said support at the respective axis and swingable in a vertical plane, and a support shank articulated to said outrigger and swingable in a respective vertical plane relative thereto;
   means on each of said legs for enabling the pivotal movement of the respective shank relative to the respective outrigger about a substantially vertical steering axis;
   rolling means on each of said shanks for rolling engagement with the ground; and
   a respective support ram telescopingly received in each of said shanks and extensible to support the platform on the ground independently of the respective rolling means.

2. The vehicle defined in claim 1, further comprising:
   respective first actuating means connected to each outrigger and the platform for swinging same about the respective upright axis joining the respective outrigger to said platform;
   respective second actuating means connected to each of said outriggers for swinging same in the respective vertical plane; and
   respective third actuating means between each outrigger and the respective shank for angularly displacing the respective shanks relative to one another.

3. The vehicle defined in claim 2 wherein each of said outriggers is formed with a parallelogrammatic linkage having a crosshead pivotally connected to the platform at the respective upright axis and a pivot head pivotally connected to the respective shank at the respective steering axis, each linkage including two link members pivotally connected to both of the respective heads and disposed one above another whereby the attitude of the respective steering axis can be maintained for different included angles of the shank and outrigger of the respective leg.

4. The vehicle defined in claim 2 wherein each of said rolling means includes a respective wheel rotatable at the end of a lever pivotally connected to the bottom of the respective shank, each of said shanks receiving a respective one of said rams telescopingly extensible from said bottom and respective control means acting on said lever for swinging the lever of the respective wheel.

5. The vehicle defined in claim 4 wherein each wheel, the respective shank, the respective lever and the respective control means lie in a common vertical plane with the wheel disposed along a side of the respective shank turned generally toward said support.

6. The vehicle defined in claim 4, further comprising a respective drive motor on each of said levers connected to the respective wheel for propelling same.

7. The vehicle defined in claim 4 wherein each of said wheels is provided with a respective brake device.

8. The vehicle defined in claim 3 wherein said second actuating means includes a cylinder disposed diagonally between said parallelogrammatic links and pivotally connected to said crosshead and a lower one of said links.

9. The vehicle defined in claim 3 wherein each shank is formed with a fork pivotally connected to the respective pivot head and defining therewith a space receiving a steering mechanism for rotating the respective shank about the respective steering axis.

10. The vehicle defined in claim 9, further comprising locking means for fixing each fork relative to the respective pivot head to prevent angular displacement about the respective steering axis.

11. The vehicle defined in claim 3 wherein said platform is rectangular and is provided at each of four corners with a respective one of said traveling legs.

12. The vehicle defined in claim 1 wherein said platform is provided with a turntable adapted to carry a working mechanism.

13. The vehicle defined in claim 1, further comprising means for operating said traveling legs as to enable said vehicle to climb a slope.

* * * * *